United States Patent [19]

Kuechler et al.

[11] Patent Number: 5,237,678

[45] Date of Patent: Aug. 17, 1993

[54] SYSTEM FOR STORING AND MANIPULATING INFORMATION IN AN INFORMATION BASE

[76] Inventors: William L. Kuechler; David W. Kuechler, both of 3 Rum Row, Hilton Head, S.C. 29928

[21] Appl. No.: 317,993

[22] Filed: Mar. 2, 1989

Related U.S. Application Data

[63] Continuation-in-part of Ser. No. 47,703, May 8, 1987, Pat. No. 4,811,199.

[51] Int. Cl.⁵ .............................................. G06F 15/40
[52] U.S. Cl. .............................. 395/600; 364/DIG. 2; 364/963.3; 364/957
[58] Field of Search ... 364/200 MS File, 900 MS File, 364/300

[56] References Cited

U.S. PATENT DOCUMENTS

| | | | |
|---|---|---|---|
| 3,568,155 | 3/1971 | Abraham | 340/172.5 |
| 4,527,239 | 7/1985 | Brandin | 364/300 |
| 4,769,772 | 9/1988 | Dwyer | 364/200 |
| 4,775,956 | 10/1988 | Kaji et al. | 364/900 |
| 4,811,199 | 3/1989 | Kuechler et al. | 364/200 |
| 4,829,427 | 5/1989 | Green | 364/200 |
| 4,918,593 | 4/1990 | Huber | 364/200 |

*Primary Examiner*—Kevin A. Kriess
*Assistant Examiner*—John Q. Chavis
*Attorney, Agent, or Firm*—Bell, Seltzer, Park & Gibson

[57] ABSTRACT

The present invention provides a system for the input, retrieval, manipulation and analysis of stored information in an information base. The system comprises an input device, a storage device, and an output device each capable of handling information base records. Each of the fields of the records is processed to produce a compact symbol or code corresponding to predefined ranges of values of an field. These codes are then stored in correspondence with the records which gave rise to them. The result of this processing is a topological map of the fields of the information base records. These topological maps may be retrieved and later processed to efficiently retrieve stored records, given any general unpreprogrammed query as input to the system. These topological maps may also be utilized in a process to determine correlations among the various fields of the records.

25 Claims, 1 Drawing Sheet

SYSTEM FOR STORING AND MANIPULATING INFORMATION IN AN INFORMATION BASE

CROSS REFERENCE TO RELATED APPLICATIONS

This application is a continuation-in-part of copending U.S application Ser. No. 047,703 filed May 8, 1987, now U.S. Pat. No. 4,811,199, granted Mar. 7, 1989.

FIELD OF THE INVENTION

This invention relates to the efficient retrieval, manipulation, and analysis of stored information in an information base, and more particularly discloses improvements to and extensions upon the information processing system and methods described in our aforementioned earlier U.S. patent.

BACKGROUND OF THE INVENTION

It is frequently desirable to retrieve information elements stored in an information base on the basis of queries—for example a search for all information elements in the information base that have certain values of certain fields or attributes. Data processing systems typically require the query specification to employ exact values in order to retrieve the desired information from the information base. Thus, mathematically exact values of particular attributes (fields) are input, which are then compared with corresponding attribute (field) values of the information elements in the information base to select those elements with exactly equivalent values. This is also true of data manipulations, such as sorting, where it is desired to output information elements based on an ordering rule of one or more attributes (first, the record with the highest attribute value, then the next highest and so on). Such selective access permits the system to abstract the information base and deal only with the elements which are pertinent to the specifications of the query.

Methods currently used to handle such selective query specifications fall into two broad classes. The first is an exhaustive iterative examination of each of the elements of the information base to find those meeting the specifications of the query. The second is to store, for all elements, duplicate values of selected attributes (associated with a corresponding element address) in a specialized data structure (index) designed for rapid access to values and corresponding information elements meeting the specification. Examples of such specialized data structures include ordered lists, trees, hashed indexes and a number of other variations, of which, only a few are commercially viable.

Where applicable, such data structures or indexes provide much faster access than iterative search methods but are subject to the following limitations:

(1) The index files needed for reference to the attribute or attributes of the information base may be of substantial size, especially when the information element contains a large number of attributes which are indexed for subsequent retrieval. In some instances the storage requirements for the index files may equal or exceed the storage requirements for the information base itself.

(2) Indexes provide efficient access only for the specific attribute or combination of attributes for which the index is designed. They are inefficient or inapplicable for the flexible inquiries encountered in commercial practice which include a broad range of logical relations between varied combinations of numerous attributes, often on the basis of partial or inexact specifications.

Thus, while these methods satisfy the minimal requirements of data processing systems, they are far from adequate for the increasingly critical need for a general approach to efficient processing of complex multi-attribute specifications.

It should be noted that there are specialized examples of current methods which superficially deal with inexact specifications, such as partial key access, occasional use of explicit ranges and some recent systems which purport to permit the use of "plain English" specifications. However, such systems are still dependent on the ability of the logic of the system to translate or cross-relate such input to an exact key structure. Thus, partial keys will locate a record in a tree index (after operator inspection of a number of incorrect records) only if the initial characters of the partial input exactly match the initial characters of the complete key. Equivalent limitations apply to all other such methods and performance becomes less efficient and more inaccurate as the specifications become less precise. This is also true of recent developments in "artificial intelligence" systems, which employ very complex (and thus computationally bound) analytical logic, rule logic, classifier logic and so on to translate incomplete and imprecise input into the most specific and highest probability output possible, generally incorporating prompts for additional input to clarify ambiguities. Conversely, there is no general approach in the prior art which purposefully utilizes less precise representations of data to enhance the efficiency and validity of manipulating exact data values. It is an object of this invention to provide such generalized systems.

SUMMARY OF THE INVENTION

Our above-noted earlier U.S. patent discloses methods and means for manipulating information in a stored information base. The information base contains a plurality of information elements or "records", each having one or more attributes or "fields". The technique disclosed in this patent is predicated on the unique compactness and ease of processing of coded maps of the attributes (fields), referred to herein as topological maps. Each topological map comprises compact symbols corresponding to predefined ranges of values of an attribute (field). A symbol for the range encompassing the value of that field for each information element (record) is stored in the topological map in correspondence to each element. The information records, as well as the topological maps, are stored in an information storage device.

A query is processed by accessing the pertinent topological map or maps based upon the specifications of the query, and identifying from the map or maps, the records in the information base which meet the specifications of the query. Simple queries concerning a single field are resolved by accessing the pertinent topological map for that field, while more complex queries involving multiple fields are resolved by combining the topological maps for the fields involved in the query in accordance with the logical operators of the query.

The field value or range of values in the specifications of the query is compared to the predefined ranges represented by the symbols in the topological map for that field. Then, by referring solely to the map, it is possible to quickly eliminate from consideration those records of the information base which, as shown by their range symbols in the topological map, could not possibly meet the specifications of the query since the mapped range for that field value is clearly outside the value or range of values in the specification. In a like manner, it is possible to quickly identify records in the information base which are known with certainty to meet the specifications of the query because the mapped range for that field value is wholly within the range specified in the query. Because the symbols used in the map represent ranges of values rather than exact values, the resolution of the query may find some information elements which "may" meet the specifications of the query but which cannot be determined with certainty solely by reference to the map. Only those information elements which "may" meet the specifications of the query need be inspected to determine whether they meet the specifications of the query.

Such extensive specifications can be processed by general purpose computers with complete accuracy and specificity at rates which are orders of magnitude faster than prior art because the compactness of such coded topological maps permits a large number of fields to be mapped with less storage than is required for prior art key structures with only one or two keys. Thus, all maps pertinent to an inquiry can be rapidly loaded into high speed semiconductor memory simultaneously and the processor not only has much less key data to evaluate, but can compare the compact codes with simple, high speed logic and can access this key data at semiconductor speeds, which are orders of magnitude faster than disk input-output transfer rates. These increases in rate of processing are compounding rather than additive and the net improvement is thus much greater than the sum of these effects.

This application discloses a number of improvements, extensions, and refinements upon the basic techniques and principles disclosed in our above-noted patent. In particular, an improved technique is disclosed for the rapid interactive handling of insertions, changes and deletions to records in the information base and the rapid interactive maintenance of the topological maps. A method is also disclosed for radically increasing the number of ranges which can be defined by the topological maps, with only a small increase in the storage requirements for the maps. This provides a significantly greater resolution capability for the system. Also disclosed is a method for utilizing the topological maps for obtaining more rapid sorting and more rapid output of records from the system. Techniques are also disclosed for file/record locking and for transaction logging to provide improved security and data recovery.

It will be evident to those skilled in the art that the scope of this invention encompasses numerous variations and that references to specific preferred embodiments are illustrative and not limiting.

DESCRIPTION OF THE DRAWINGS

Further features and aspects of the invention will become apparent from the detailed description and illustrative example which follow and from the accompanying drawing, in which the FIGS. 1 and 2 are a block schematic representations illustrating the primary elements of the system of the present invention.

DESCRIPTION OF ILLUSTRATIVE EMBODIMENT

Figure 1:
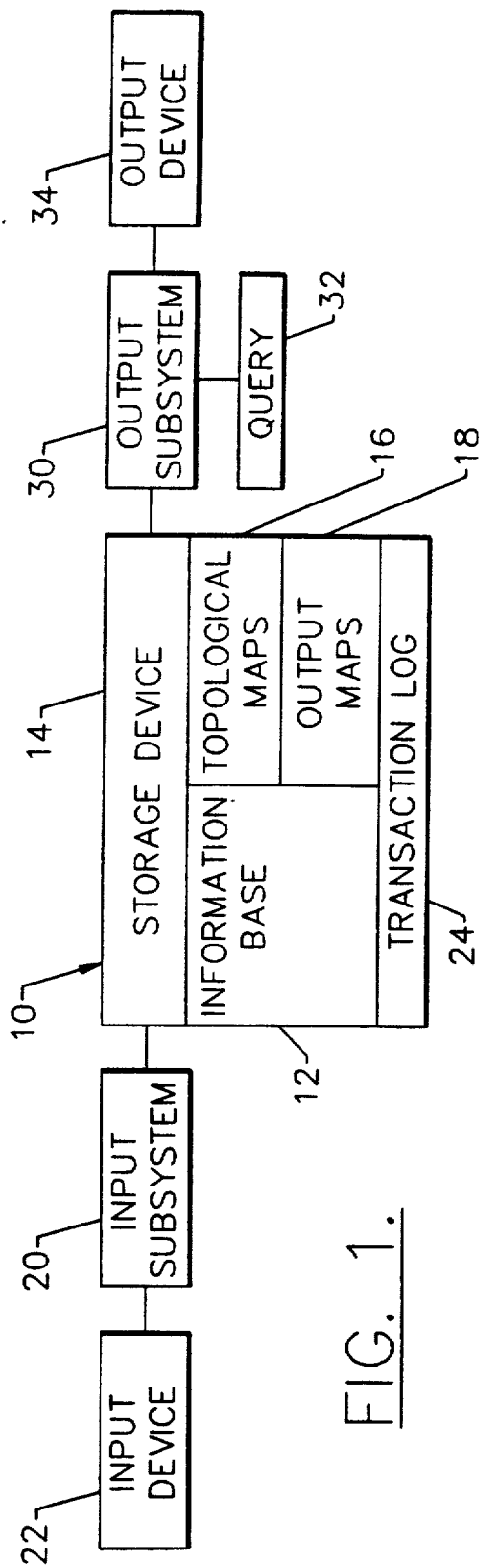

The present invention is essentially a contextual reference information retrieval system. Given any reference to information by content of the information, this system efficiently retrieves information matching the specification.

As illustrated schematically in the figure, the system, generally indicated by the reference character 10, is used to access and manipulate an information base 12 which is stored in a storage device 14. The information base 12 is comprised of one or more information elements and each information element is comprised of one or more attributes. In the conventional terminology used in the computer database field, information elements in a database are referred to as "records" and the respective attributes of an information element or record are referred to as "fields". One or more of the attributes (fields) of each record have an "orderable value", meaning that the attribute (field) of the element has a value capable of being evaluated and being placed in some order in relation to the value of that field for other records in the information base. This may include numbers, characters of the alphabet, symbols, codes, etc.

The system 10 consists of two subsystems: an input subsystem 20, and an output subsystem 30. The input subsystem accepts input from an input device 22. The input device 22 is capable of receiving information base elements where an information base element is comprised of one or more fields and the corresponding values for these fields. The input subsystem 10 is used to process the individual information base records as they are input to the information base, or as changes or deletions are made and to produce processed representations or "topological maps" 16 of the fields of the information base elements. The topological maps 16 are stored in the storage device 14 for subsequent use by the output subsystem 30.

The output subsystem 30 is given a query 32 as input, i.e., a reference to the information on the basis of a specification of the values of one or more fields. The query 32 may be entered into the output subsystem 30 by any suitable input device, and may for example, utilize the same input device 22 as is employed by the input subsystem 20. The output subsystem 30 then utilizes the storage device 14 to retrieve the topological maps 16 of the fields referenced by the specification. These topological maps are then manipulated in accord with the query, the end result being one or more output maps 18 indicating information base records which either:

1) *Do* meet the specification, or
2) *May* meet the specification, or
3) *Do not* meet the specification.

The output map thus defines a "superset" of the records in the information base which meet the specification of the query. It is a superset because some of the elements "may" satisfy the query.

The output map which is generated indicates which of the elements in the superset do meet the specification of the query and which of those elements mav meet the specification. Those elements which the map indicates do meet the specification are known with certainty without ever having accessed or inspected the stored records themselves. Now, only those elements which the output map indicates may meet the specification are accessed and inspected to determine which ones do meet the specification. The results of the query are communicated to the user by an output device 34. As will become apparent from the illustrative example which follows, the output subsystem is capable of rapidly resolving various kinds of queries, including queries as to exact values of certain fields, range queries, and complex queries about multiple fields using Boolean logic.

The specific configuration of the storage device 14 is not critical, and may take various forms depending on how the present invention is implemented. In a microcomputer implementation, for example, it is desirable that at least a portion of the data storage device comprise high speed random access memory, such as semiconductor memory for example. The topological maps would be loaded into the high speed random access memory during resolution of a query to facilitate manipulation and processing of the maps. Additional data storage —e.g. for permanent storage of the records of the information base and topological maps—can be handled by other suitable data storage means such as magnetic media, bubble memory devices, optical (laser) memory devices, etc.

For illustrative purposes, we will consider an example of applying this technique to an information base composed of elements represented by fixed length ASCII records. Each element in the information base is comprised of fields; each field type can be either "Alpha", meaning that it can store characters or digits, or "Integer" meaning that it can store an integer value (represented as an ASCII string of digits). The field list for the elements of this information base is shown below:

| Field Name | Type | Length |
| --- | --- | --- |
| NAME | Alpha | 10 |
| SALARY | Integer | 4 |
| JOB-ID | Integer | 4 |

The contents of this sample information base are:

Record Numbers ↓

| | NAME | SALARY | JOB-ID |
| --- | --- | --- | --- |
| 0 | Bob | 7500 | 5371 |
| 1 | Joe | 6150 | 3475 |
| 2 | Jim | 1900 | 7249 |
| 3 | Bill | 4300 | 1537 |
| 4 | Ridge | 6300 | 6492 |
| 5 | Jeff | 8900 | 894 |
| . | . | . | . |
| 100 | Kim | 2400 | 1564 |
| 101 | Beverly | 3700 | 2198 |
| 102 | Jane | 5350 | 3642 |
| 103 | | | |

Thus, the information base contains 103 records (since we started numbering with 0), and slot 103 is currently the End of File for this information base.

Using the above as the information base, a description of the process is given below.

Input Subsystem (a) Range Definition

Before the topological maps may be created, a range definition must be created for each field. The range definition comprises one or more unique ranges of values for the field, i.e., partition values defining a lower bound and an upper bound for this field. Collectively all the ranges which make up the range definition for the field must include all possible values of this field for all elements in the information base, i.e., for every possible field value there must be at least one range which includes that value. One way to determine such a range definition is to arbitrarily define these ranges. An example of a "range definition" is:

| Range Number | > | <= |
| --- | --- | --- |
| 0 | $-\infty$ | 300 |
| 1 | 300 | 700 |
| 2 | 4000 | 7372 |
| 3 | 5700 | 9300 |
| 4 | 700 | 4000 |
| 5 | 7372 | $+\infty$ |

In the above example, six ranges (0 through 5) are defined. The values under the column headings "<" and ">=" are "partition values" which define the lower and upper boundaries, respectively, of the ranges.

An information base record is said "to map" to a particular range of an field if the value of the field for that record is included in said range. The field value is also said to map to that range.

Some examples of values and the range(s) to which they map for this definition are:

| Value | Range Number(s) |
| --- | --- |
| 4563 | 2 |
| 5900 | 2,3 |
| 12 | 0 |
| 479 | 1 |

Although the ranges may be constructed to overlap, as shown above, advantageously, these ranges are constructed to be mutually exclusive so that any given value of a field maps to exactly one range in the range definition. Additionally, it is in general advantageous to have approximately equal number of records map to each range of a field. This can be done by taking a sample of the records in the information base and selecting a range definition such that an equal number of the records in the sample map to each range, i.e., the range definition "equi-partitions" the sample. Assuming the size of the sample was large enough to be statistically significant, this range definition will also serve to approximately equi-partition the information base as a whole.

Additionally, a unique code/representation is associated with each of the ranges for a field. Thus, if a range definition with 250 ranges were created, the range including the lowest field values would be assigned a 0, the next lowest range a 1, and so on up to 249 for the highest range.

This advantageous range definition for an field can be effected by this method:

(a) Determine the number of ranges to be in the range definition, NUM-RANGES. (A typical value of NUM-RANGES is 250.)

(b) Take (NUM-RANGES * SAMPLES-PER-RANGE) samples from the information base, and place each entry in a separate slot in an array, the SAMPLE-ARRAY. (A typical value of SAMPLES-PER-RANGE is 30.)

(c) Sort the entries in SAMPLE-ARRAY into ascending order (based on the ordering rule appropriate for this type of field).

(d) Then every SAMPLES-PER-RANGE'th entry is selected from SAMPLE-ARRAY to serve as the upper-bound for a range (the lower bound being defined by the previous upper bound). This result is stored in RANGE-DEF-ARRAY. Finally, the last value stored in RANGE-DEF-ARRAY is the highest value possible for this field.

To take a specific example, consider the case of our information base described above. Assume that we wish to create a range definition for SALARY, NUM-RANGES=8, and SAMPLES-PER-RANGE=5. Thus, we must take (NUM-RANGES * SAMPLES-PER-RANGE)=(8 * 5)=40 samples from the information base transferring the value of SALARY from the information base element selected to an entry in the SAMPLE-ARRAY. Graphically, the sampling operation can be seen as:

SAMPLE-ARRAY

|   | NAME | SALARY | JOB-ID |
|---|------|--------|--------|
| 0 | Bob | 7500 | 5371 |
| 1 | Joe | 6150 | 3475 |
| 2 | Jim | 1900 | 7249 |
| 3 | Bill | 4300 | 1537 |
| 4 | Ridge | 6300 | 6492 |
| 5 | Jeff | 8900 | 894 |
| . | . | . | . |
| 100 | Kim | 2400 | 1564 |
| 101 | Beverly | 3700 | 2198 |
| 102 | Jane | 5350 | 3642 |
| 103 | | | |

|   |      |
|---|------|
| 0 | 3475 |
| 1 | 6492 |
| . | . |
| 39 | 2198 |

Now that we have SAMPLE-ARRAY filled with sample values, the array is sorted in ascending order. Once it is sorted, every SAMPLE-PER-RANGE'th value of the sorted SAMPLE-ARRAY is used as the upper bound for a range. Graphically, this process can be seen as:

SAMPLE-ARRAY

| 19 | 5100 |
| 20 | 5300 |
| 21 | 5475 |
| 22 | 5920 |
| 23 | 6050 |
| 24 | 6130 |
| 25 | 6492 |
| 26 | 6720 |
| 27 | 6815 |
| 28 | 6870 |
| 29 | 6940 |

RANGE-DEF-ARRAY

| 3 | 5100 |
| 4 | 6130 |
| 5 | 6940 |

The end result of this process is that RANGE-DEF-ARRAY looks like this:

| 0 | 1380 |
| 1 | 2970 |
| 2 | 4450 |
| 3 | 5100 |
| 4 | 6130 |
| 5 | 6940 |
| 6 | 8570 |
| 7 | 9280 |
| 8 | ∞ |

Truncated partition Values

Field values of any length may be processed as illustrated in the preceding example. However, typical information for most data fields is distinct within the first 8 bytes for all but a fraction of a percent of the data. Thus, loss of definition is statistically negligible if, for example, partition values are limited to 8 bytes. This can provide a substantial saving in storage for the range definitions as well as significant reductions in disk input/output and processing time when loading and evaluating the ranges corresponding to any specific query.

To illustrate, consider the following example of RANGE-DEF-ARRAY for a field of company names up to 36 characters in length.

| RANGE-DEF-ARRAY | | TRUNCATED RANGE-DEF-ARRAY | |
|---|---|---|---|
| 0 | American Tobacco Company | 0 | American |
| 1 | Babcock Manufacturing Incorporated | 1 | Babcock |
| 2 | Canadian Service Company | 2 | Canadian |
| 3 | Denver Distributing Incorporated | 3 | Denver D |
| ↓ | ↓ | ↓ | ↓ |

Inspection of the two arrays shows that 'CASPER INDUSTRIAL CO.' is as accurately classified into range 2 by the truncated array as by the full field array. Thus, with the exception of a few cases where concentrations of similar data may produce more maybes with a truncated array, the result is a significant enhancement of overall performance.

Interpolation of Partition Values

A code map based on 2 bytes per record, where the codes in the second byte represent sequential subdivisions of the partition values assigned to the first byte, provides a means for radically increasing the number of ranges with only a small increase in storage requirements for the maps. Thus, a one byte code can represent up to 256 ranges while a 2 byte code can represent 256×256 or 65536 ranges—a gain of 256 in resolution for an increase of only 1 byte per record in storage and input/output requirements.

This enhanced resolution can be realized without increased storage for the secondary range values by dynamically calculating second byte range values as a fraction of the ASCII values of the first byte range values. This is illustrated by the following example for a three byte field of alpha characters from A to Z where the upper bound of range 1 is 'ACA' and the upper bound of range 2 is 'AFA', with ASCII values (in hexadecimal) of 414341h and 414641h respectively. The difference between these two values would be 000300h.

Dividing this by 256 (0100h) would provide a range of 03h per sub-range.

| RANGE-DEF-ARRAY | ASCII | SUB-RANGE-DEF-ARRAY | |
|---|---|---|---|
| 0 ACA | 414341 | 00 ACA | 414341 |
| | | 01 ACD | 414344 |
| | | 02 ACG | 414347 |
| | | ↓ | |
| 1 AFA | 414641 | 10 AFA | 414641 |
| ↓ | | ↓ | |

This process can be repeated for each sub range and range to dynamically establish an upper bound for all sub ranges. In actual practice, the sub range values are only computed for records of interest by simply multiplying the sub range code number times the average value per sub range, determined as above. No conversion to alpha values is required, since the input values are already in ASCII format and these are directly comparable with the calculated sub range values.

A file with 256 records per primary range would average only one record per sub-range. Thus, a query specification of 'ACE' would require 256 disk accesses to resolve for this file if only the primary range were utilized but only one record access is necessary using the sub-ranges.

Obviously, other methods than straight line interpolation could be used for determining the sub range values, such as log scale or non linear ranges based on more detailed statistics, depending on the actual distribution of the data. Additionally, it is evident that it may be desirable to use variable code sizes dependent on the size of the file or the field. For example, 1 byte per record for files up to 1000 records, 2 bytes per record up to 200,000 records, and 3 bytes per record for larger files. Similarly, fields up to 3 bytes or fields with a narrow data range (i.e. the 51 states) may be fully resolvable with only one byte per record. Concurrently, the number of partition values stored can be advantageously increased as file size increases to more sharply define the limits of sub ranges for fields where concentrations of similar data tend to occur.

Single Value Sub Range Partition Values for Identical Keys

The sub-range partition value as defined above also provides a mechanism for efficiently identifying and processing the occasional large groups of identical keys which occur in practical data bases. Examples include zip codes and cities in a customer file for a regional business. For example, by reserving the value 'zero' of the sub range code to indicate that the value of that record is identical to the partition value associated with the main code value, all records with that main code value and a zero value sub-code can be exactly identified as meeting or not meeting a query without inspection of the records, even though the query parameter was between two partition values and would otherwise generate a maybe for those records.

The following example illustrates the improved resolution possible using this 'single value' convention for the file defined in 2.1.2, above, assuming that the file contains 50 records with the identical key value of 'ACA' for this field.

| RANGE-DEF-ARRAY | ASCII | SUB-RANGE-DEF-ARRAY | |
|---|---|---|---|
| 0 ACA | 414341 | 00 ACA | 414341 |
| | | 01 ABZ | 41425A |
| | | 02 ACD | 414344 |
| | | 03 ADG | 414347 |
| | | ↓ | |
| 1 AFA | 414641 | 10 AFA | 414641 |
| ↓ | | ↓ | |

Note that the above range values are identical with the prior example, but that range '00' now includes only the single key 'ACA', range '01' includes all values below 'ACA' and codes for all other ranges have been incremented by one. Using the prior array definition, a query specifying a value of 'ACA' for this field will produce 'maybe' for all records with a code of '00', including the 50 records with this identical value. All of these records will require access to the actual records for resolution, since the code indicates a possible value between 'ACA' and 'ABZ' for each record.

Using the 'single value' convention, only the 50 identical value records will be selected and will be known to meet the specification without accessing the records. This provides extremely rapid response to queries which include a large group of identical keys. Obviously, this convention is readily extended to ranges other than 'zero' by incorporating provisions to identify such other ranges as single valued and to store or dynamically compute the values associated with such ranges. Inherent properties of the partition distributions and code maps permit convenient application of this convention to many fields with little or no added complexity.

Practical design considerations lead to the selection of uniform parameters, such as a two-byte code, for a broad range of file and field sizes. Thus, small numeric fields and alpha fields with a limited range of values (i.e. the 50 state example above) inherently tend toward single value ranges in practice, since two-byte codes hold enough information to exactly define the record value by applying the same analytical logic required to determine yes, no, maybe status for larger or more varied fields.

Radix Sorting for Rapid Input/Output

Radix sorting methods basically separate random information into ordered sets with the items in each set related by a common radix or root value and the sets ordered according to the value of the radices. This is repeated for secondary, tertiary, etc. radices until the information is fully ordered. For example, the random set of words

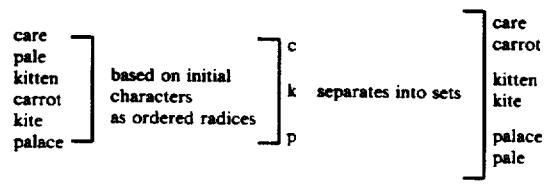

For this simple example, simply interchanging the words within the second set will provide a fully ordered list but it is evident that repeating this technique with sequential syllables will efficiently order a much more extensive and complex set of data.

The topological maps of the present invention inherently classify records into partially sorted sets falling between the sequential partition values of the range codes. This not only permits the application of radix techniques to accelerate sorting by an order of magnitude, but also provides the unique capability to begin output of sorted data almost instantly and to continue output coincident with the sorting process.

Since only a small percentage of the records can be processed in high speed memory at a time with a practical size of file, conventional techniques must load, sort and output sets of records which contain the complete spectrum of data. In order to merge these sets, records from every initial pass must be compared with records from every other initial pass because any of these sets may contain records at either limit of the sorted order.

Radix sorting using the topological maps as indices permits these initial sets to be ordered so that like records are grouped and need not be compared with any other set. This sharply reduces the number of comparisons and sets which must be processed to obtain fully ordered output relative to conventional sorting methods. Early output is possible because the records corresponding to the first set or sets in the order specified are selected by code and quickly loaded in a sequential skim of the data file. This limited set is processed by a quick sort into individual record order and output in seconds, even with a very large file.

Since printing speeds are orders of magnitude slower than processing speeds, the remaining records are then loaded efficiently in large groups and radix sorted into sets, using the codes as radix coefficients, while the original set is still printing. These sets are then reloaded in set order and quick sorted into individual record order to maintain continuous output. For non-interactive processing, the initial skim is omitted and records are processed in the largest groups feasible to minimize disk access time.

Early output is not generally consistent with minimum total sort time, but this is irrelevant for interactive processes such as screen display or printed output. In such cases, the primary benefit to the user is how quickly the output can be reviewed on the screen or how soon the printed output is available. Since output device are order of magnitudes slower than processing times, the present invention provides both the perception and the reality of order of magnitude improved utility to the user.

Thus, a user can begin reviewing data on the screen or check initial printer output to confirm its validity within seconds, while current techniques will require minutes or even hours before the first sorted output is available. An error in specifying sort order or report content can be detected, aborted and restarted with loss of only a fraction of a minute, while conventional methods might involve lost time of many minutes to an hour or more if such an error occurs. Additionally, printed output is complete and available before conventional systems can finish the sort and begin to print.

Note that the above improvements relative to conventional sorting methods are independent of the additional major advantage that can be attained if a highly selective criteria is applied to the data to be sorted. With conventional methods, every record must be loaded to determine whether the record should be included in the sorted output, while the method of the present invention loads only the selected records. If only a small percentage of records meet the criteria, the present invention will complete the sorted output before conventional systems have finished reading the file.

Input Operation

The input procedure comprises the following processing steps:

(A) Inputting one or more information base records each of which has one or more fields, each field having a value.

(B) For each field
  (1) For each record
    (a) Determine the range to which the field maps using the range definition defined for this field.
    (b) Store the code representing the range to which this field value mapped in a location in this field's topological map which corresponds to this record's record number.

To determine the range to which a value VALUE maps, the following algorithm is applied:

(a) FOR i := 0 TO NUM-RANGES
  (1) IF RANGE-DEF-ARRAY[i] >= VALUE GOTO EXIT
(b) EXIT: RETURN(i);

So, i is incremented until we find a boundary value which is greater than or equal to the value. At this point, the index into the RANGE-DEF-ARRAY is the range number for this value of this field.

Graphically, this process can be seen as:

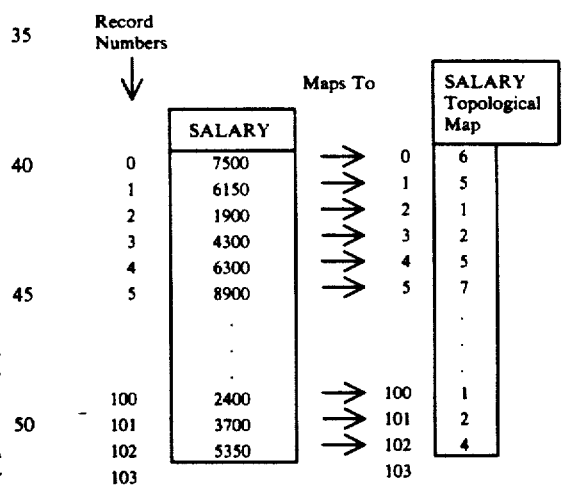

The information base has been stripped in the above illustration to show just the SALARY field, as this is the field which we are concerned with inputting. The method described above is used for each value to determine the range to which it maps. The corresponding range number for the range to which the value maps is then stored in the SALARY topological map in correspondence with the record which gave rise to it. In this case, the correspondence is kept by using the record number for each information base element as the offset into the topological map in which to store the range number for the record.

For further illustration, consider a new element to be added to the information base:

| NAME | SALARY | JOB-ID |
|------|--------|--------|
| Jo Jo | 2200 | 8391 |

This record is stored at the end of file (EOF):

|  | NAME | SALARY | JOB-ID |
|--|------|--------|--------|
|  | . | . | . |
|  | . | . | . |
| 100 | Kim | 2400 | 1564 |
| 101 | Beverly | 3700 | 2198 |
| 102 | Jane | 5350 | 3642 |
| 103 | Jo Jo | 2200 | 8391 |
| 104 |  |  |  |

A new topological map entry is made as follows:

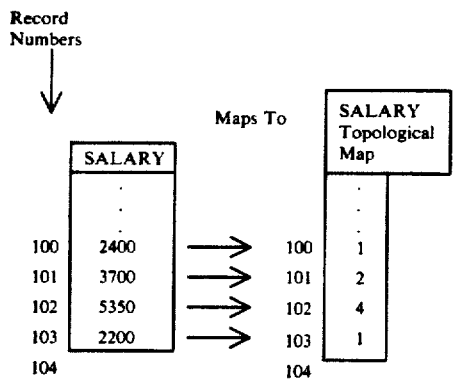

If the above method is literally applied to an information base, then each time a new record is added or an field of an existing record is changed, an update is required for each field's topological map. In the case of our example information base there are three fields. Therefore, each record being added will require three accesses to update the topological maps. In the case of an information base wherein each element is described with 12 fields (not uncommon), this would require 12 accesses being made per element added. For our example information base, if 100 elements were added to the information base, then (100 * 3)=300 accesses would be required.

Update Processing

For interactive processing, insertions, changes and deletions are uniformly and efficiently effected by:

a. Adding both new and changed records to the end of the file.

b. Maintaining a coded correspondence (status map) using, for example, 2 bits per record indicating whether each record is valid (2 bits set), deleted (no bits set), or 'dead' -i.e. replaced by a changed record at end of file (one bit set).

This provides simple, rapid interactive handling of map maintenance, since uncoded records, whether additions or changes, are treated as maybe's and are efficiently read as a block pending updating of the file. Similarly, the compact code maps are retained in high speed memory and codes are sequentially added to the end of each map during input, minimizing processing and access requirements. Space occupied by deleted or 'dead' records is quickly and efficiently recovered by moving the block of records at the end of the file sequentially into the 'open' record spaces identified by the update map and the corresponding block of codes at the end of each map into the positions corresponding to the new locations of the records in the file. This file update is done transparently to the user during idle CPU cycles between responses to the much slower interactive input processes. Additionally, this method provides the detailed data required for rollback or recovery with minimal additional disk access, as discussed under transaction logging below.

Figure 2:
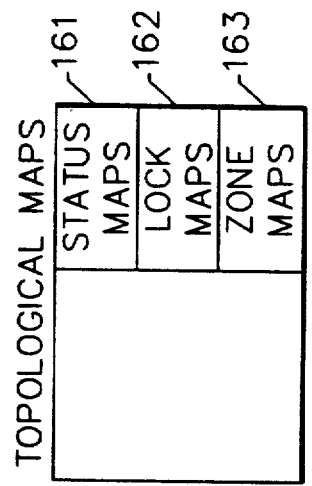

To illustrate, in a fully updated file, the code map for field one and the status map, a type of topological map (see 161 of FIG. 2), may be as shown below:

```
                                                    2
                                                    0
                                                    0
Record #                    1 2 3 4 5 6 7 8 9 ........0
Code Map                    236172958763592936........78
Status Bits                 111111111111111111........11
```

During input to change record 5 to code 34, to add a new record with code 55 and to delete record 9, the maps are altered as follows:

```
                                                  2 2 2
                                                  0 0 0
                                                  0 0 0
Record #                    1 2 3 4 5 6 7 8 9............0 1 2
Code Map                    236172958763592936...........783455
Status Bits                 111111110111111100............111111
```

When the file is again fully updated, the maps appear as follows:

```
                                                    2
                                                    0
                                                    0
Record #                    1 2 3 4 5 6 7 8 9............0
Code Map                    236172953463592955............78
Status Bits                 111111111111111111............11
```

Large bulk updates under program control, such as those generated by end of day posts, introduce criteria which are quite different from those of interactive updates for efficient updating of files and maps. Input data is typically available in large batches stored in transaction-entry files and input is thus read from these files at machine speeds. Since a large percentage of a file is usually affected, the above technique for interactive processing becomes less efficient because so many of the records must be treated as maybe's as processing proceeds. There is no fortuitous idle CPU time, similar to interactive processes, during which updates can be incrementally processed with no perceptible penalty in execution time.

Bulk updates, however, do proceed in efficient, sequential, contiguous steps through the file, providing an equally efficient approach which is effectively the invert of the above method for interactive updating. Since the sequential file access leaves the disk positioned at the same location as the record currently being processed, it is efficient to write the updated records back to disk in the original location as they are processed. With the compact code maps in high speed memory, the codes are also updated rapidly as the records are processed and the updated maps are efficiently written back to disk as a block at the end of processing. However, this means that the original values are no longer available in the file and must be stored separately for possible rollback or recovery, if this should prove necessary.

Since bulk updates are contiguous, this can be handled with efficiency comparable to the interactive method above by accumulating the original values in a buffer and periodically writing these as a contiguous block to the end of the transaction file. In effect we have inverted or interchanged block writes to the file for interactive processes with block writes to the transaction file for bulk updates, but the different processing characteristics make each specific approach equally efficient for that specific process.

Transaction Logging

In conjunction with interactive update methods described above, a transaction log (see 24 of FIG. 1) requires only compact entries to store a transaction number, length of entry, affected record numbers, an offset in the log file as an entry validity confirmation, plus a committed code which is written only after all other data has been saved to disk.

The record detail required to rollback if a transaction is not committed or to recover if a system crash occurs is already available in the file itself or in the status map and need not be duplicated in the transaction log. This method greatly reduces the size of the log relative to conventional methods, correspondingly reducing overhead for log maintenance and enhancing system speed. Note that the combination of interactive update processing and transaction logging as defined above will typically result in user perception of virtually instantaneous response for interactive and small scale updates.

In contrast, as noted above, bulk updates provide no fortuitous idle CPU time corresponding to the lags in input typical of the slow interactive input procedures but this is offset by the contiguous nature of the bulk process, which permits efficient block updating at the end of the transaction file. Thus, the transaction log entries for bulk processes are substantially identical to those defined above for interactive processes except that a copy of the original data is appended to each entry and the entries for a given process are stored contiguously in the transaction log.

File/Record Locking

Record locking is provided by a one byte per record map, a type of topological map (see 162 of FIG. 2), with 1 bit set for an exclusive lock, a second bit set for an update lock, and six bits set to identify up to 63 user share locks. Setting only the last 6 bits indicates the number of share locks set. Record status can be determined by simply checking the state of the byte in this map corresponding to each record which would otherwise be acceptable—i.e. if the exclusive bit were set by one user for a corresponding record, access would be denied to a subsequent user, even though the record would otherwise be acceptable by selection criteria.

In order to properly sequence users in a multiuser environment, a user requesting record locks would first obtain a system lock on the file. This would avoid conflicts from a second user for the very brief period it would take to set locks in this compact record lock map. The system file lock would then be released, permitting any subsequent user to determine lock status of records or to set his own locks on non-conflicting records.

A similar method and map would be used for file locking, based on a correspondence of one byte per file to the order of file definition records in a data dictionary. A data dictionary is simply a system file which contains one record for each data file, each record consisting of fields identifying a file and defining the general parameters of that file.

Output Subsystem Operation

One general form of query is called a Boolean query. It is defined to be one or more range queries joined by AND, OR, or NOT. A range query is query in the form:

$$(<value> <= <field\ name> <= <value>)$$

In the case of our example information base, a range query might be:

$$(3000 <= SALARY <= 4500)$$

This query means that we would like to retrieve all information base elements which have a value of the field SALARY which is between 3000 and 4500.

The output procedure consists of receiving a query as input, and then producing a superset of those records which meet the query specification. This production of a superset given a query is termed "resolving" the query. The result describes for each record in the information base one of three states of the element with respect to the query.

(a) NO.

This element does not meet the specification.

(b) YES.

This element does meet the specification.

(c) MAYBE.

This element may meet the specification. Due to quantization error with the ranges, we are not certain whether or not this record meets the specification.

The method for resolving a range query utilizing the topological maps created by the input process will be shown first. Next, the resolution of a query which involves Boolean combination of range queries will be shown.

Range Query Resolution

Consider a query of the form:

$$(<low\text{-}value> <= <field> <= <high\text{-}value>)$$

An example of this query is:

$$(4500 <= SALARY <= 6350)$$

For the following discussion, ACCEPTABLE is an array of integers which has one entry per range of the field. Each element in this array may have one of three values:

(a) NO_VALUE:

Indicates the elements having this range number would definitely not meet the range specification.

(b) YES_VALUE:

Indicates the elements having this range number would definitely meet the range specification.

(c) MAYBE_VALUE:

Indicates the elements having this range number may or may not meet the range specification.

The method for resolving this range query is:

(NOTE: map(value) returns the range number of this value for an field).

(a) Generate ACCEPTABLE array. This allows the range query to be resolved for an record by a straight lookup in the ACCEPTABLE array given that element's range number.
  (1) Set low-range=map(low-value).
  (2) Set high-range=map(high-value).
  (3) FOR i :=0 TO (low-range−1)
    (a) ACCEPTABLE[i]:=NO_VALUE.
  (4) ACCEPTABLE[low-range]:=MAYBE_VALUE.
  (5) FOR i:=(low-range+1) TO (high-range−1)
    (a) ACCEPTABLE[i]:=YES_VALUE.
  (6) ACCEPTABLE[high-range]:=MAYBE_VALUE.
  (7) FOR i :=(high-range+1) TO MAX_RANGE_NO
    (a) ACCEPTABLE[i]:=NO_VALUE.
(b) Retrieve the topological map for this field, and store in TOPOLOGICAL-MAP. TOPOLOGICAL-MAP is an array of integers.
(c) Create a map, OUTPUT-MAP, which has one entry per entry in TOPOLOGICAL-MAP. OUTPUT-MAP is an array of integers.
(d) FOR i :=0 TO (NUM-ENTRIES-IN-MAP - 1)
  (1) OUTPUT-MAP[i]:=ACCEPTABLE[TOPOLOGICAL-MAP[i]].

Every entry in OUTPUT-MAP now contains either NO_VALUE, or YES_VALUE, or MAYBE_VALUE, indicating whether or not the corresponding information base element does not meet the specification, does meet the specification, or may meet the specification, respectively.

Graphically, the creation of the ACCEPTABLE array for a query (such as 3300<=SALARY<=7300) can be seen as:

```
                  Field
Range Numbers ──>
   0   1   2   3   4   5   6   7   8
 +---+---+-XXXXX+XX+XXX+XX+XXX--+---+-- ~ ~ +
   N   N   ↑M   Y   Y   Y   M↑  N   N
           │               │
        low-value       high-value
```

NOTE:
X and +'s in between X's represent values of interest
N:No.
Y:Yes.
M:Maybe.

Thus, values mapping to range 0 or 1 are clearly not within the specification. Values mapping to Range 2 may be in the specification, as some values mapping to this range are within the range specification, and some values mapping to this range are outside of the range specification. Values mapping to ranges 3, 4, or 5 are within the specification. Values mapping to range 6 may or may or may not be in the range specification for the same reason given for range 2. Finally, values mapping to range 7 or 8, are not within the specification.

The creation of the OUTPUT-MAP can be seen as:

```
Field
Topological           Output
Map                   Map 100  1   ──>   100  N
101  2   ──>   101  M
102  4   ──>   102  Y
103  1   ──>   103  N
104            104
```

Boolean Query Resolution

In general, the range queries described above can be joined together with AND, OR, and NOT to create a more complex query. Examples are:

((3500<=SALARY<=5000) AND
(2130<=JOB-CODE<=2240))

((7200<=SALARY<=7900) OR
(4160<=JOB-CODE<=5000))

((7200<=SALARY<=7900) AND (NOT
(4160<=JOB-CODE<=5000)))

The Range Query Resolution described above allows us to resolve the individual range queries, but the method for handling Boolean combinations of logic has not been disclosed. The Boolean combinations of range queries are handled by the following general method:

(a) Resolve each of the range queries in the Boolean query, placing the result in a different map (intermediate output map) for each range query.

(b) Logically combine the results (intermediate output maps) for the range queries according to the Boolean query.

The truth tables for each of the Boolean operators are given below:

| AND | | |
|---|---|---|
| A | B | A AND B |
| N | N | N |
| N | M | N |
| N | Y | N |
| M | N | N |
| M | M | M |
| M | Y | M |
| Y | N | N |
| Y | M | M |
| Y | Y | Y |

This truth table should be fairly evident simply on common-sense application of the meanings of these terms in real life. E.g., N AND Y=N. If something should be both (a) and (b) and if it is (b) but is not (a), then (a) and (b) is not true. Another example: Y AND M=M. If something should be (a) and (b), and we know it is (a) and it may be (b) then it may satisfy (a) and (b).

| OR | | |
|---|---|---|
| A | B | A OR B |
| N | N | N |
| N | M | M |
| N | Y | Y |

-continued

| | OR | |
|---|---|---|
| A | B | A OR B |
| M | N | M |
| M | M | M |
| M | Y | Y |
| Y | N | Y |
| Y | M | Y |
| Y | Y | Y |

Again, this is fairly evident from common-sense application of the meanings of the terms.

| | NOT A | |
|---|---|
| A | NOT A |
| N | Y |
| M | M |
| Y | N |

Consider the example of $(2000 <= SALARY <= 5250)$. Then, the values of interest would be:

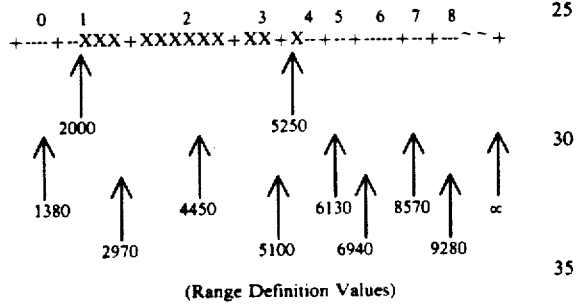

(Range Definition Values)

Then clearly, 0 is N, 1 is M, 2–3 is Y, 4 is M, and 5–8 is N. If we consider (NOT $(2000 <= SALARY <= 5250)$), then the values of interest are:

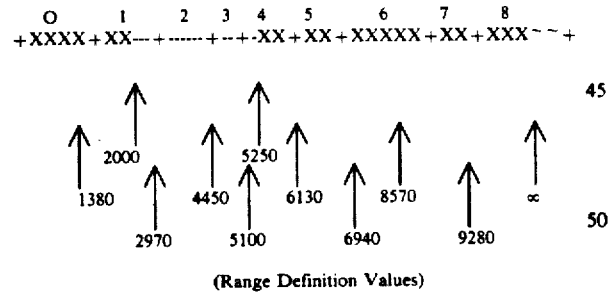

(Range Definition Values)

In this example, clearly range 0 is Y, 1 is M, 2–3 is N, 4 is M, and 5–8 is Y. Thus, the Y ranges turned to N ranges, the N ranges turned to Y ranges, and the M ranges stayed M.

Discussion and Examples

Thus, if we had a query of the form:

(RANGE-QUERY-1 AND RANGE-QUERY-2)

RANGE-QUERY-1 would be resolved, and the result placed in OUTPUT-MAP-1. RANGE-QUERY-2 would be resolved and placed in OUTPUT-MAP-2. Then, OUTPUT-MAP-1 would be AND'ed with OUTPUT-MAP-2 according to the truth table given above for AND to give an output map RESULT. RESULT indicates those records which do meet the specification, those which do not meet the specification, and those which may meet the specification.

Now, to consider a specific example, let's say we had a query:

$((3500 <= SALARY <= 5500)$ OR
$(1300 <= JOB\text{-}ID <= 2300))$

The range definition for SALARY given above and the acceptable array for this query looks like:

| | SALARY Range Definition | | SALARY Acceptable Array |
|---|---|---|---|
| 0 | 1380 | 0 | N |
| 1 | 2970 | 1 | N |
| 2 | 4450 | 2 | M |
| 3 | 5100 | 3 | Y |
| 4 | 6130 | 4 | M |
| 5 | 6940 | 5 | N |
| 6 | 8570 | 6 | N |
| 7 | 9280 | 7 | N |
| 8 | ∞ | 8 | N |

The range definition for JOB-ID (which was not specified previously in this example) looks like:

| | JOB-ID Range Definition | | JOB-ID Acceptable Array |
|---|---|---|---|
| 0 | 300 | 0 | N |
| 1 | 735 | 1 | N |
| 2 | 1750 | 2 | M |
| 3 | 2125 | 3 | Y |
| 4 | 2700 | 4 | M |
| 5 | 3400 | 5 | N |
| 6 | 4300 | 6 | N |
| 7 | 4750 | 7 | N |
| 8 | ∞ | 8 | N |

Considering the first portion of the information base, we have:

| | NAME | SALARY | JOB-ID |
|---|---|---|---|
| 0 | Bob | 7500 | 5371 |
| 1 | Joe | 6150 | 3475 |
| 2 | Jim | 1900 | 7429 |
| 3 | Bill | 4300 | 1537 |
| 4 | Ridge | 6300 | 6492 |
| 5 | Jeff | 8900 | 894 |
| | . | | |
| | . | | |

The topological maps and output maps for the SALARY and JOB-ID terms are:

| SALARY Topological Map | | SALARY Output Map | |
|---|---|---|---|
| 0 | 6 | 0 | N |
| 1 | 5 | 1 | N |
| 2 | 1 | 2 | N |
| 3 | 2 | 3 | M |
| 4 | 5 | 4 | N |
| 5 | 7 | 5 | N |
| . | . | . | . |

| JOB-ID Topological Map | | JOB-ID Output Map | |
|---|---|---|---|
| 0 | 8 | 0 | N |
| 1 | 6 | 1 | N |
| 2 | 8 | 2 | N |
| 3 | 2 | 3 | M |
| 4 | 8 | 4 | N |
| 5 | 2 | 5 | N |
| . | . | . | . |

Thus, combined (OR'ed together), we have:

| SALARY Topological Map | | JOB-ID Output Map | | Query Output Map | |
|---|---|---|---|---|---|
| 0 | N | 0 | N | 0 | 8 |
| 1 | N | 1 | N | 1 | 6 |
| 2 | N | 2 | N | 2 | 8 |
| 3 | M | 3 | M | 3 | M |
| 4 | N | 4 | N | 4 | N |
| 5 | N | 5 | M | 5 | M |
| . | . | . | . | . | . |

Thus, records 0, 1, 2, and 4 have been eliminated from consideration, and records 3 and 5 may or may not satisfy the query.

Complex Queries

Complex queries are those including mathematical relationships between variables such as (field1/field2), (field1/field2)≃2, (field1*field2)/field3 and so on. Any number of fields and operators (i.e. log, tan, etc.) may be specified although in general, queries seldom incorporate more than two or three fields and operators due to the limited capabilities of users to deal with more complex logic. Complex queries are advantageously resolved by constructing a yes, no, maybe matrix based on range values dynamically computed from the range values of the fields referenced in a given complex query expression.

In the case of an expression such as (field1*field2)>10000, the partition values for the expression (field1*field2) could be evaluated by sequentially multiplying the partition value of range1 for field1 by the partition value of every range for field2, repeating this for range2 of field1, then for range3 and so on. The results can be viewed as a two dimensional matrix with range codes of field1 as index1 and range codes of field2 as index2 and each element of the matrix having the value computed from the partition values of the corresponding codes. This computed value would represent the maximum value that any record mapping to the corresponding two codes could attain.

Assuming that a record mapped to (range40, range50), with partition values of 40 and 100, respectively, the value of the matrix element (40,50) would be 4000, establishing that none of the records with these codes would satisfy the query. However, if the ranges were monotonically increasing, it would also be evident that no record with codes between 0 to 40 for field1 and 0 to 50 for field2 would meet the query. Thus, it is possible to eliminate computation of most of the values of the matrix if the minimum value of the code for field1 which could satisfy the query can be efficiently determined for each code of field2. All records with codes above this minimum for both fields would be known to meet the criteria and all records below this minimum would be known to not meet the criteria without further computation.

The minimum range for field1 satisfying the query can be determined rapidly by binary searching the partition values of field1 for each partition value of field2. Thus, if there were 256 ranges for each field, only about 8 calculations would be necessary for each of the 256 ranges of field2, a reduction of 32:1. Computation can be further reduced by computing minimums for coarser ranges of field2, such as every third or fourth range. Resolution is reduced, resulting in additional time to resolve maybe's, butt this is more than offset by the further major reduction in computation time in some situations. The best balance between resolution and computation time, which depends on disk access speed, file size, and the nature of the query, can be established by conventional optimization techniques.

To illustrate, if the above example were resolved based on every 32nd range for a 2,000 record file, the partition values would be:

| | RANGE | | | | | | | |
|---|---|---|---|---|---|---|---|---|
| | 31 | 63 | 95 | 127 | 159 | 191 | 223 | 255 |
| Field1 | 32 | 64 | 96 | 128 | 160 | 192 | 224 | 256 |
| Field2 | 64 | 128 | 192 | 256 | 320 | 384 | 448 | 512 |

From these 8 ranges for each field, 64 ranges can be established for the above expression. With binary searching for field2, only 15 of these values need to be calculated.

| | | Field 2 | | | | | | |
|---|---|---|---|---|---|---|---|---|
| | | 1 | 2 | 3 | 4 | 5 | 6 | 7 | 8 |
| | 1 | | | | 8192 | 12288 | 16384 | | |
| F | 2 | | 8192 | 12288 | 16384 | | | | |
| i | 3 | 6144 | 12288 | | 24576 | | | | |
| e | 4 | 8192 | 16384 | | 32768 | | | | |
| l | 5 | 10240 | 20480 | | 40960 | | | | |
| d | 6 | | | | | | | | |

-continued

|   | Field 2 | | | | | | | |
|---|---|---|---|---|---|---|---|---|
|   | 1 | 2 | 3 | 4 | 5 | 6 | 7 | 8 |
|   |   |   |   |   |   |   | 7 |   |
| 1 |   |   |   |   |   |   |   | 8 |

Because the ranges are monotonically increasing, it is obvious that the value for the combination of ranges m,n must be less than the values for the combination m+1,n and m,n+1 both of which must be less than the combination m+1,n+1. Thus, examination of the results for expression ranges 1,1 to 1,8 shows that ranges 1,1 to 1,3 will all be less than range 1,4, which is less than the query value. Thus, all of these ranges cannot meet the query and can be designated no (N) without further computation.

In the inverse sense, it is evident that ranges 2,5 through 2,8 must meet the query since these are greater than 2,4, which is greater than the query value. Thus all of these ranges can be designated yes (Y) without further computation. Finally, the specified value of greater than 10,000 is obviously contained within range 1,5 and this can be designated maybe. The same logic can be applied to all other expression ranges to resolve them without further computation, as follows:

|   |   | Field 2 | | | | | | | |
|---|---|---|---|---|---|---|---|---|---|
|   |   | 1 | 2 | 3 | 4 | 5 | 6 | 7 | 8 |
|   | 1 | N | N | N | N | M | M | M | M |
| F | 2 | N | N | M | Y | Y | Y | Y | Y |
| i | 3 | N | M | Y | Y | Y | Y | Y | Y |
| e | 4 | M | Y | Y | Y | Y | Y | Y | Y |
| l | 5 | M | Y | Y | Y | Y | Y | Y | Y |
| d | 6 | M | Y | Y | Y | Y | Y | Y | Y |
|   | 7 | M | Y | Y | Y | Y | Y | Y | Y |
| 1 | 8 | M | Y | Y | Y | Y | Y | Y | Y |

From the above tables, it is evident that matrix element 1,1 corresponds to field1, range31−field2, range 31; matrix element 1,2 corresponds to field1, range 31−field2, range 64 and so on. Since the range values are monotonically increasing, it is also evident, that any record with intermediate range values, say range 31,range50, will have the same status as matrix element 1,2 and so on. Thus, inspection of this matrix shows that only 8 of the 64 ranges are uncertain (i.e. maybe) and thus only 8/64 or 125 of the 2,000 records need be accessed to establish all records which meet the above query and all records which do not. In contrast, conventional methods require access to and computation of the entire 2000 records.

It is obvious that a generalized embodiment of the above method for resolving complex queries requires logic to cope with variations in the structure of the query. Thus, if field2 were decreasing or if the expression were field1/field2, the logic of which ranges meet the criteria would be inverted. Such considerations fall within the framework of conventional computational techniques and the above method can be readily generalized by use of routine mathematical principles.

Dynamic Mapping

When specific queries are frequently referenced, it is common practice to maintain additional fields in which the computed values of such query expressions are stored for each record. Despite the substantial penalty in added storage, this is justified for current systems by the major reduction in processor time otherwise required to repeatedly resolve such queries by conventional techniques. A typical database also contains many numeric fields which are only occasionally referenced by a broad and varied range of query expressions. Such infrequent queries are currently resolved dynamically but at the expense of prolonged processing times.

A common example is a payroll database including, in part, fields such as:

| Hourly Pay Rate | (HPR) |
|---|---|
| Standard Hours | (SH) |
| Overtime Hours | (OH) |
| Overtime Multiplier | (OM) |
| FICA % | (FI %) |
| Unemployment % | (UE %) |

Frequently referenced expressions which involve combinations of these variable field values include:

Gross Pay = HPR*SH + OH*HPR*OM

FICA
   Deduction = (HPR*SH + OH*HPR*OM)-
   *FI% = gross pay*FI%

Unemployment
   Deduction = (HPR*SH + OH*HPR*OM)-
   *UE% = Gross Pay*UE%

A dozen more expressions necessary to maintenance of a payroll system can be derived just from the few fields above but those familiar with such systems will recognize that this example is highly simplified relative to the large number of data fields and expressions necessary to the maintenance of a practical payroll system. Gross pay is typical of a number of derived values which appear repeatedly, as illustrated above, and thus are commonly computed once and stored in additional fields to minimize recomputation.

Dynamic derivation of partition values and maps, as defined in the above discussion of complex query resolution, is generally applicable to database systems incorporating the principles of the present invention. As illustrated, partition values and code maps corresponding to the results of queries may be dynamically derived from maps for the referenced fields so efficiently and rapidly that queries involving multiple field values are resolved in a small fraction of the time required for a conventional system. Thus, database may be designed to efficiently store only the minimum fields from which all other necessary data can be computed.

Zoned Code Maps

Current methods for physical access to specific records by exact key values, such as B-tree or hashed index files, are extremely efficient for interactive access, typically requiring only one or two disk accesses per record. Since one disk access is the absolute minimum if the record is to be physically loaded into memory, there is no basis to improve access speed by software techniques. Speed of access is limited only by hardware capabilities and is perceived as essentially instantaneous by the user for interactive access to a specific record.

When a large number of records are accessed by specific key under program control, however, method in accordance with this invention can provide substantial improvement if the requests are set oriented. Conventional methods provide no preknowledge of the physical order of the set of records and the records are accessed in random fashion. This requires constant backward and forward seeks which are very slow compared to reading records in a physically sequential pattern through the file.

Since the topological maps of the present invention provide the necessary information to pre-arrange the records in a set, the file is read in sequential order, providing very substantial improvement in speed of set oriented processing. In one test, for example, the best conventional system currently available required 14 seconds to access 500 specific records in random fashion while it took only 4 seconds to perform the identical test with the present invention when records were processed as a set.

In contrast, when record requests are presented in random order, the method requires almost as much processing for each record as would be necessary for the complete group of records if processed in set order, since it is necessary to scan the entire map and construct an acceptability array for each individual record, rather than for the entire set. Additionally, since the results are returned as each key is received, the method is also forced into a random disk access pattern, thus losing the advantage of efficient sequential disk access.

Under these conditions, conventional methods have an advantage, relative to the basic access method of this invention because only a small portion of the index file must be scanned to find the location of the record. Conventional indices are stored in small groups known a pages or buckets which can be identified based on the key. Examination of only one or two of these small groups is sufficient to locate the record.

Equivalent efficiency is attained with methods in accordance with the invention by maintaining small bit maps, i.e. zone maps, a type of topological map (see 163 of FIG. 2), for each range of a designated key field, where each bit set corresponds to a small zone of the code map containing a record within that range. Thus, it is only necessary to scan the fraction of the code map within the identified zones to find all occurrences of a specific range. For example, if a file of 2,000 records is divided into 40 sequential zones of 50 records each, the zones can be identified by the corresponding bit in a 40 bit (5 byte) string. Considering only the 256 primary ranges of a code map, an average of 8 records will occur in each range. The zones containing these records can be identified by setting the bit corresponding to each zone encompassing each of these 8 records.

To illustrate, consider a query specification of field2=120 relative to the example outlined in 2.1.7 above. Assuming that values are evenly distributed over the 256 primary ranges and randomly distributed in the file, the value of 120 for field2 may occur in records 7, 253, 519, 775 1031, 1289, 1543 and 1802. With 40 sequential zones of 50 records, the distribution would be:

| Zone | 1... | 6... | 11... | 16... | 21... | 26... |
|---|---|---|---|---|---|---|
| Rec. | 1 | 251 | 501 | 751 | 1001 | 1251... |
| to | 50 | 300 | 550 | 800 | 1050 | 1300... |
| Rec. | | | | | | |

This distribution is represented by the following bit map indicating presence (1) or absence (0) of a record with range59, which contains the value 120.

| Zone | 1.... | 10.... | 20.... | 30.... | 40 |
|---|---|---|---|---|---|
| Map | 10000 | 10000 | 10000 | 10000 | 10000 10000 10000 1000010000 |
| Byte | 1 | 2 | 3 | 4 | 5 |

By evaluating the position of bits set in this 5 byte zone map, all zones which may contain a record with the value of 120 can be rapidly determined. Only the 50 positions in the code map corresponding to each of the 8 zones need then be compared with the code value of 59, corresponding to the specified value of 120, to locate all records of interest. Since it requires about 4 comparisons per byte to evaluate the zone map, this reduces the number of comparisons necessary to evaluate the query from 2000 to 420, a reduction of almost 80% in processor time. While index size and maintenance of key fields is fractionally increased, typically only one of ten to twenty fields per file is designated for exact key access and the overall effect is only about one percent. Also, the small increase in processing time to maintain the zone maps typically occurs during interactive input of new records when idle CPU cycles are available and is thus invisible to the user.

VARIATIONS AND OTHER APPLICATIONS

Representation Of Maps

The topological maps used in accordance with the invention may be represented in various manners. The standard representation is usually thought of as an array of codes, each code corresponding to a record of the information base. Another possible representation is to have one bit-map per record, each bit corresponding to a given code. Another possibility is to have one bit-map per set of records, setting the bit corresponding to each code to which the field values in the set map. Still another possibility is to have a multi-level bit-map.

For example, with 64 codes, ordinarily, we would think that it is necessary to have a bit-map with 64 positions on it. However we can reduce this storage requirement to only 16 bits.

Construct two sets of bit-maps:
1) Corresponds to the code / 8 (/ means integer division).
2) Corresponds to the code % 8 (% means modulus division).

Thus, if we have a record which has an field value corresponding to code 28, we set two bits in the bit-maps corresponding to this record. We set the bit corresponding to (28 / 8)= =3 in map 1. We set the bit corresponding to (28 % 8)= =4 in map 2.

To get the bit-map corresponding to any code, e.g., code 35, we fetch the bit-map corresponding to (35 / 8)= =4 in map 1, and the bit-map corresponding to (35 % 8)= =3 in map 2. By ANDing these two maps together, we have a map indicating exactly those records which have an field which maps to code 35.

The same can be done for multiple records per bit, only in that case some uncertainty is present when regenerating the maps, i.e., the map recreated for code 35 would not necessarily contain only records which have an field which map to code 35. However, this error is statistically controllable.

These bit-maps are most advantageously stored bitwise, i.e., the bit 0's of all the maps would be stored together, then all of the bit 1's, then all of the bit 2's, etc. Thus, when presented with a range query, simply retrieve all the maps corresponding to the desired range(s) and OR these together to form a map indicating all subsets of records which do not contain a record in the specified range(s).

Derived Fields

Not only is it possible to create and store maps for fields which are stored directly in the record, but it is also possible to store maps for fields which are calculated from the fields in the information base. For example, if we have a database having personnel records containing both the individual's gross income and tax rate, then we may get any number of queries referring to net income, i.e., (gross income * tax rate). We can store in correspondence with the database, a map of net income, where each time the record is stored, the net income is calculated and then a map entry stored as with any field. Then, when a query is received referencing net income, this map may be used to isolate the records, without ever having to calculate any values.

The full scope of the term "derived" can be extended a little by the following example. If instead of having the tax rate stored directly in the record, let's say we store gross income and deductions. Based on gross income and deductions, a look-up in another database may be performed which results in determining the tax rate. We can store the net income map as described above, if when each record is stored, we look up the tax rate given the information in the record, and calculate net income and store a map entry. The point here is that "derived" does not necessarily mean straightforward computations. They can be values looked up in a database, or derived from an expert system for that matter.

Multiple Records Per Representation

It is possible to extend the concept of the subset of records to encompass having more than one record as long as the logic utilized to manipulate the maps is consistent.

To consider an example, let's say we have a database containing multiple personnel records. We can choose to represent the range(s) to which a subset of records maps by a bit-map, this bit-map containing one bit for each range. Then, given a subset of records, we determine the ranges to which the values of the field of the individual records map. Then, we set the bits corresponding to these ranges.

When given a range query on this field, we can set up a bit-map containing a 1 in all bits which correspond to ranges that fall within or overlap with the query range. Then, each entry in the map is AND'ed with this mask, and if any non-zero bits are found in the result, then this subset may contain one or more records which meet the specification, otherwise, we have eliminated this subset with certainty.

Graphically:

```
Bit    0  1  2  3  4  5  6  7
       |  |  |  |  |  |  |  |
Age    0 10 20 30 40 50 60 70 80
```

Thus, bit 0 will have a 1 in it if a record in the subset has a record with (0< =Age<10), bit 1 will have a 1 in it if a record in the subset has a record with (10< =Age<20), etc. For example, say we have two personnel records per subset, and a subset contains these two records.

| Name:   | Bill  |
|---------|-------|
| Age:    | 25    |
| Salary: | 35000 |
| Name:   | Jim   |
| Age:    | 32    |
| Salary: | 42000 |

Then, the field map representation for Age for this subset would be calculated as:

00110000

The calculation is:

```
Bit    0  1  2  3  4  5  6  7
      | 0| 0| 1| 1| 0| 0| 0| 0|
Age   0 10 20 30 40 50 60 70 80
```

Since Bill has (Age= =25), (20< =Age<30), which means set bit 2. Jim has (Age= =32), (30< =Age<40), which means set bit 3.

Please note that the number of records per subset for two maps could be different, and the maps may still be used together.

Data Analysis

The principles of the present invention can be readily applied to detect correlations in data among two or more variables. Given two or more variables, and maps for these variables, it is very straightforward to determine if there may be correlations among these variables. For example, let's say that we have two variables which apply to all records in a database, Age and Salary, and assume that Age and Salary are each partitioned into 50 ranges.

If we wish to determine if there is a correlation between Age and Salary, this can be done by creating a (50×50) array of integers. Initially, we set each position to 0. Then, we fetch the maps corresponding to Age and Salary. The codes for Age and Salary for each record together make up an ordered pair which can be used a reference to a specific element in the (50×50) array. For each record, using the code for Age and the code for Salary, we create such an ordered pair, and then increment the corresponding array element by 1. This process is repeated for each record in the database.

At the end of this process, we have an array of counts. Statistically, since we know the number of records in each range for both Age and Salary (we can just count them to determine this), we can estimate the expected number of records in each "grid-point" (i.e., intersection of an Age range and Salary range) if the two variables are independent of one another. By comparing this number with the actual number of records counted, it may be determined if a statistically significant difference between the number of records expected to be observed and actually observed is present; this, of course, serves as the basis for stating that there is a correlation (or not) between these two variables.

There are two extensions to this process:

1) Extend it to n variables from 2. I.e., we can have three variables if we set up a 3-d matrix.

2) Examine only a subset of the total information base. E.g., we may never see a correlation in the above (between Age and Salary) until we limit the records for consideration to be from a single profession. Then, the correlation seen would be quite profound.

Thus, using our standard query techniques, we can narrow the sample down to a relevant subset of the records in the entire information base.

Implementation on a Microcomputer

From the foregoing illustrative example, and the description of the process and algorithm given therein, persons skilled in programming of digital computers will readily appreciate that the system and process of the present invention is capable of being implemented and utilized with computers of various types architectures and sizes, including microcomputers and mainframes, and using various programming languages and techniques.

Dedicated Architectures

A primary advantageous application of the present invention is to simplify data relational operations into straightforward manipulations which can easily be handled by a digital computer. However, further optimization can be obtained by designing specialized hardware to do these simple functions.

Often when processing a query, an array of integers, each integer corresponding to a range (an "acceptability table"), is used. For example, an array entry will be 3 if the corresponding range meets the query specification, 1 if the corresponding range may meet the query specification, and 0 if the corresponding range does not meet the query specification. The map for the field is then retrieved, and each entry in the map is processed in turn, causing a look-up into the array of integers, and if the entry in the array of integers is 0, then this record is eliminated from consideration, by writing a 0 in the position in the "acceptability map" corresponding to this record. It is straightforward to build a specialized chip which performs only this specific action. The "acceptability table" could be loaded directly on the chip at the start of the operation, a count of number of entries in the map to process as well as two vectors: one to the map for the field, the other to the "acceptability map". Then, the chip could begin processing, the processing rate greatly improved because:

1) No bus bandwidth would be utilized with instruction fetches. Hand in hand with this is the fact that no execution time is spent decoding instructions. The logic is hard-coded in the operation of the chip.

2) No bus bandwidth is utilized to "acceptability table" look-up, since this table is loaded directly on the chip. In effect, the chip can be processing one record per two bus cycles.

To extend this a bit further, the dividing line between software and hardware is very arbitrary. In general due to cost considerations, only very general pieces of logic are implemented in hardware and then levels of software are used to build functionality using that hardware base. In the case of the present invention, this hardware synthesis can be expected to be particularly advantageous, as the basic operations are straightforward and are generally applicable to all applications of the present invention.

That which we claim is:

1. An information base system comprising:
   (a) an information storage device;
   (b) a file comprising a plurality of information records stored in said storage device, each record having at least one attribute with an orderable value;
   (c) a topological map stored in said storage device for at least certain ones of said attributes, said map comprising a plurality of predetermined range codes representing a predetermined number of ranges of attribute values, said ranges collectively including the attribute values for all information records in the information base, and wherein said plurality of range codes are arranged in an array which defines a correspondence between each of said information records and the ranges to which they map;
   (d) input means, cooperating with said information storage device, for receiving a query having specifications based upon specified parameters related to an attribute of the stored information records;
   (e) means, responsive to the query received by said input means, for accessing the topological map based upon said query and for identifying from said map, without inspection of the information records, information records in the information base based upon the specifications of the query and for indicating whether each respective information record does, does not, or may meet the specifications of the query;
   (f) means, responsive to the identifying means, for generating an output map and storing in said output map the identification of the information records in the information base based upon the specifications of the query; and
   (g) output means, responsive to said output map generating means, for accessing the information records identified by the output map based upon the specifications of the query, and for displaying said information records identified by the output map.

2. A system as defined in claim 1 wherein said topological map includes means defining sub-ranges for each of said range codes.

3. A system as defined in claim 1 wherein said topological map comprises a series of two byte fields, with each one of said fields corresponding to one of said records in the file, and wherein said first byte of each of said fields contains said range codes and said second byte of each of said fields contains sequential sub-ranges of the range code assigned to the first byte, whereby a significantly greater number of ranges are defined by combining the range codes of the first byte with the sub-ranges of the second byte.

4. A system as defined in claim 1 wherein partition values define the limits of the respective ranges of said topological map, and said topological map further comprises means for indicating when an attribute value of a record is equal to the partition value.

5. A system as defined in claim 4 wherein said topological map comprises a series of two byte fields, with each of said two byte fields corresponding to one of said records in the file, and wherein said first byte of each of said two byte fields contains said range codes and wherein a zero value in said second byte of said two byte fields indicates that the attribute value of a record is equal to the partition value.

6. A system as defined in claim 1 wherein said topological map further comprises a status map stored in said information storage device, said status map comprising a means for indicating for each of said records whether the record is valid, deleted, or replaced.

7. A system as defined in claim 6 wherein said indicating means comprises a series of two bit fields, with each of said two bit fields corresponding to one of said records in the file, and wherein the number of bits set in the two bit field indicates whether the record is valid, deleted or replaced.

8. A system as defined in claim 6 including an input device for receiving operator input of updated information about an existing record in said file, means for adding to the end of said file an additional record containing said updated information and means for setting the indicating means for said existing record in said status map to indicate that the record has been replaced.

9. A system as defined in claim 6 including means for identifying by said status map, open spaces in said file occupied by replaced records, for moving the added information records at the end of the file into said open spaces, and for moving the corresponding range codes of each topological map into the positions corresponding to the new locations of the moved records in the file.

10. A system as defined in claim 1 including an input device for receiving operator input of additional records, means for adding the additional information records to the end of said file, and means for adding to the end of said topological map, the range codes for the attributes of the added information records.

11. A system as defined in claim 1 including a transaction log stored in the information storage device, said transaction log containing the identity of the information records affected by update processing.

12. A system as defined in claim 1 wherein said topological map further comprises a record locking map stored in the information storage device, said record locking map comprising a means for indicating for each of said records the locking status of each of said records.

13. A system as defined in claim 12 wherein said record locking map indicating means comprises a series of one byte fields, with each of said one byte fields corresponding to one of said records in the information base, and wherein the number of bits set in the one byte field indicates the locking status of each of said records.

14. A system as defined in claim 1 additionally including means for ordering said information records into segregated sets in correspondence to said range of attributes values for at least one of said attributes, wherein each said set includes only records having range codes corresponding to said records in said topological maps for said attributes which are included in a predetermined subset of range codes.

15. A system as defined in claim 1 wherein said topological map further comprises zone maps stored in said storage device in correspondence, to said range codes of at least one of said attributes, each said zone map comprising a string of zone codes in correspondence to sets of range codes in said topological map, and wherein each said zone code indicates the presence or absence within said corresponding set of range codes of said range code corresponding to said zone map.

16. A system as defined in claim 1 additionally including means for accessing said range values and topological maps for one or more of said record attributes and for dynamically generating therefrom, for one or more derived attributes, range values and topological maps which correspond to the exact derived attribute values calculable from the specific values of said record attributes for each said record.

17. A method for processing information in an information base system comprising
(a) storing in an information storage device a plurality of information records, each record having a plurality of attributes with an orderable value;
(b) also storing in the information storage device, for at least certain ones of said attributes of the records, a typographical map which includes a plurality of range codes representing a predetermined number of ranges of attribute values, which ranges collectively include the attribute values for all information records it he information base, and an array of said range codes which defines a correspondence between each of said information records and the ranges to which they map;
(c) receiving a query having specifications based upon specified parameters and logic related to one or more attributes of the stored information records;
(d) accessing the topological maps for each attribute specified in the query and generating therefrom an output map having records which correspond to each of the information records in the information base and which indicate whether each respective information record does, does not, or may meet the specifications of the query; and
(e) accessing the information records in the information base corresponding to the records in the output map and displaying at least one of the information records in the information base corresponding to the records in the output map in response to the query.

18. A method as defined in claim 17 wherein said ranges also include a status map comprising an indicator for indicating for each of said records whether the record is valid, deleted, or replaced.

19. A method as defined in claim 18 wherein said indicator comprises a series of two bit fields, with each of said two bit fields corresponding to one of said records in the file, and wherein the number of bits set in the two bit field indicates whether the record is valid, deleted or replaced.

20. A method as defined in claim 18 including the steps of adding additional information records to the end of said file, and adding to the end of said topological map, the range codes for the attributes of the added information records.

21. A method as defined in claim 18 including the steps of adding to the end of said file an additional record containing updated information about a record which has been changed, and setting the indicator for the changed record in said status map to indicate that the record has been replaced.

22. A method as defined in claim 18 including the step of identifying by said status map, open space in said file occupied by replaced records, moving the added information records at the end of the file into said open spaces, and moving the corresponding range codes of each topological map into the positions corresponding to the new locations of the moved records in the file.

23. A method as defined in claim 18 including the step of storing in the information storage device a transaction log containing the identity of the information records affected by update processing.

24. A method as defined in claim 18 wherein said topological map also includes a record locking map comprising an indicator for indicating for each of said records the locking status of each of said records.

25. A method as defined in claim 24 wherein said record locking map indicator comprises a series of one byte fields, with each of said one byte fields corresponding to one of said records in the information base, and wherein the number of bits set in the one byte field indicates the locking status of each of said records.

* * * * *